United States Patent

Suzuki et al.

[11] Patent Number: 5,845,737
[45] Date of Patent: Dec. 8, 1998

[54] POWER STEERING SYSTEM INCLUDING A ROTARY CONTROL VALVE WITH MULTIPLE VARIABLE ORIFICE CONFIGURATIONS

[75] Inventors: Mikio Suzuki, Hekinan; Katsuhisa Mori, Okazaki; Hideaki Sugiyama, Nagoya, all of Japan

[73] Assignee: Toyoda Koki Kabushiki Kaisha, Kariya, Japan

[21] Appl. No.: 588,922

[22] Filed: Jan. 19, 1996

[30] Foreign Application Priority Data

Jan. 19, 1995 [JP] Japan ................................ 7-006168

[51] Int. Cl.⁶ .................................................. B62D 5/083
[52] U.S. Cl. .......................... 180/441; 180/417; 180/442
[58] Field of Search .................................. 180/417, 421, 180/422, 429, 441, 404, 442

[56] References Cited

U.S. PATENT DOCUMENTS

| | | |
|---|---|---|
| 3,404,704 | 10/1968 | Adams . |
| 4,577,660 | 3/1986 | Haga et al. . |
| 4,848,402 | 7/1989 | Elser et al. . |
| 5,092,418 | 3/1992 | Suzuki et al. . |
| 5,439,070 | 8/1995 | Haga et al. ........................... 180/421 |
| 5,515,938 | 5/1996 | Haga et al. ........................... 180/417 |
| 5,538,095 | 7/1996 | Haga et al. ........................... 180/441 |
| 5,638,912 | 6/1997 | Haga et al. ........................... 180/417 |

FOREIGN PATENT DOCUMENTS

| | | |
|---|---|---|
| 0 594 137 | 4/1994 | European Pat. Off. . |
| 0 653 342 | 5/1995 | European Pat. Off. . |
| 0 687 616 | 12/1995 | European Pat. Off. . |
| 43 19 495 | 12/1993 | Germany . |

Primary Examiner—J. J. Swann
Assistant Examiner—Gary Savitt
Attorney, Agent, or Firm—Oblon, Spivak, McClelland, Maier & Neustadt, P.C.

[57] ABSTRACT

In a power steering apparatus comprising a pump, a reservoir, a power cylinder having two opposite chambers, and a rotary control vale, the rotary control valve consists of a first control portion which communicates between the pump and the reservoir, and a second control portion which communicates not only between the pump and the reservoir but also with the power cylinder. In the first control portion, each of four underlapping variable orifices is so provided as to take the form of underlap in itself. In the second control portion, two underlapping variable orifices are provided on the side of the pump, and besides each of two overlapping variable orifices is so provided as to take the form of overlap in itself on the side of the reservoir. In this manner, while a steering wheel is operated within a predetermined angle, an opening area of the overlapping variable orifice changes little. When the steering wheel is operated beyond the predetermined valve, the opening are increases sufficiently according to steering operation. As a result, a differential pressure between the chambers is prevented from originating at and around the neutral position of the steering wheel. Consequently, as for steering feeling, the rigidity of the steering operation at and around the neutral position is enhanced, and furthermore, a beginning point where the power assist is produced by operating the steering wheel from its neutral position is distinguished.

11 Claims, 6 Drawing Sheets

POWER STEERING SYSTEM INCLUDING A ROTARY CONTROL VALVE WITH MULTIPLE VARIABLE ORIFICE CONFIGURATIONS

BACKGROUND OF THE INVENTION

1. Field of the Invention

The present invention relates to a power steering apparatus suitable for use in automobiles and the like, and more particularly, it relates to the improvement of a hydraulic power steering apparatus which is designed to enhance the rigidity of steering operation, or to obtain a steady feeling of the steering operation, at and around the neutral position of a steering wheel.

2. Description of the Prior Art

Figure 7:
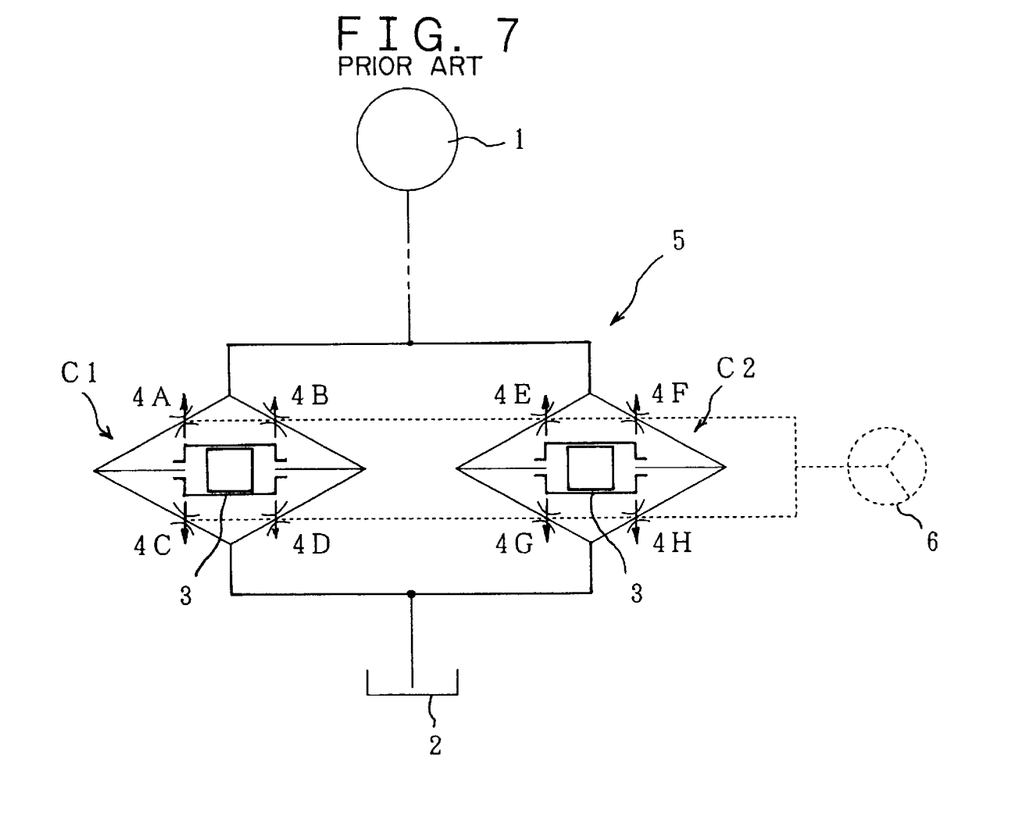
FIG. 7 is a typical diagram showing a conventional power steering apparatus.

In generally, the conventional hydraulic power steering apparatus comprises, as it is shown in FIG. 7, a pump 1, a reservoir 2, a power cylinder 3 for assisting steering operation and having a pair of chambers opposing each other, and a rotary control valve 5 consisting of two hydraulic bridge circuits C1, C2 which coincide with respective configurations of variable orifices 4A~4D and 4E~4H. The rotary control valve 5 controls a flow of pressurized fluid supplied from the pump 1 according to the rotational operation of a steering wheel 6. As a result, instantly the flow of the pressurized fluid is supplied to the one of the chambers of the power cylinder 3, the other flow is drained from the other of the chambers to the reservoir 2.

Besides in the FIG. 7, although the power cylinder 3 is shown in each of the hydraulic bridge circuits C1, C2 for the sake of convenience, in point of fact, the power cylinder 3 is sole in this conventional power steering apparatus.

Figure 6:
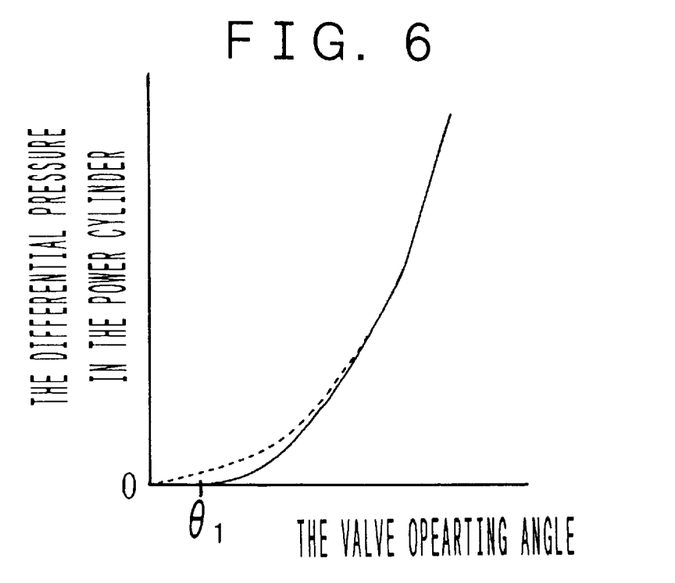
FIG. 6 is an another graph showing a relationship between the valve operating angle of the rotary control valve and a differential pressure in a power cylinder.

It is desirable for the hydraulic power steering apparatus to design so as not to originate a differential pressure between the chambers in the power cylinder 3 at and around the neutral position of the steering wheel 6, as it is shown in a solid line of FIG. 6. In the aforementioned conventional hydraulic power steering apparatus, even As the steering wheel is operated slightly from its neutral position, the differential pressure in the power cylinder 3 increases distinctly as shown in a dotted line of the Pig. 6. This is caused by a weighty fluctuation in each opening area of the variable orifices 4A~4E of the rotary control valve 5, and consequently, the driver cannot make certain of a beginning point where the power assist in produced by operating the steering wheel 6 from its neutral position. Thus, a steady feeling of the steering operation cannot be obtained at and around the neutral position of the steering wheel 6. Namely, there is a problem in which the center of the steering operation cannot be settled on its neutral position.

Moreover, an adjustment of the beginning point is restricted within a narrow range, and besides, the beginning point cannot be distinguished.

BRIEF SUMMARY OF THE INVENTION

Accordingly, a primary object of the present invention is to provide an improved power steering apparatus capable of enhancing the rigidity of steering operation at and around a neutral position of a steering wheel.

Another object is to distinguish a beginning point which the power assist is produced by operating the steering wheel from its neutral position relating to steering feeling.

Further object is to provide an improved power steering apparatus capable of expanding an adjustment of the beginning point.

Briefly, in the present invention, a rotary control valve of the power steering apparatus consists of first and second control portions which compose respective hydraulic bridge circuits. The first control portion comprises four variable orifices respectively arranged on four passages, which communicate with either a pump or a reservoir. At a result, the first control portion controls a flow of pressurized fluid supplied from the pump to the reservoir according to the steering operation. The second control portion also comprises four variable orifices respectively arranged on four passages, which communicate with either the pump or the reservoir, and furthermore; all communicate with the power cylinder. According to the steering operation, the second control portion controls the flow of the pressurized fluid supplied from the pump to the power cylinder and the one of the pressurized fluid drain d from the power cylinder to the reservoir as well.

Especially relating to formation of the variable orifice made up of a plural pairs of opposite convex portions on two valve members which are comprised in the rotary control valve, each of variable orifices in the first control portion respectively take in such the positional relation as to underlap a pair of the convex portions at and around the neutral position of the steering wheel, or take the form of underlap in itself in the neutral state of the rotary control valve. It will be named as an underlapping variable orifice hereinafter. Consequently, the flow of the pressurized fluid supplied through the first control portion becomes to decrease as the steering wheel is operated. On the other hand, in the second control portion, the ones of the variable orifices, which are especially provided in the side of either the pump or the reservoir, take in such the positional relation as to overlap a pair of the convex portions at and around the neutral position of the steering wheel, or take the form of overlap in itself in the neutral state of the rotary control valve. It will be named as an overlapping variable orifice hereinafter. The others of the variable orifices in the second portion is arranged like the underlapping variable orifice. Accordingly, in the second control portion, the flow of the pressurized fluid supplied from the pump to the one of chambers begins to increase when the steering wheel is operated beyond an overlapping amount between the opposite convex portions.

In this manner, the flow of the pressurized fluid from/to the power cylinder is restricted at and around the neutral position of the steering wheel. And furthermore, both of the chambers of the power cylinder communicate with either the pump or the reservoir equally. As a result, the differential pressure does not originate between the chambers of the power cylinder.

In more detail, giving an example in which the overlapping variable orifices are arranged on the side of reservoir in the second control portion, the rotary control valve operates so as to increase the flow of the pressure fluid supplied from the pump to the power cylinder, as the steering wheel is rotated. Hence, the discharge pressure of the pump becomes slightly high, whereas the differential pressure does not substantially originate until the relative rotational angle between the valve members reaches a predetermined angle, because the opposite convex portions remain overlapping each other. Thus the differential pressure remains substantially to zero. Therefore, at and around the neutral position of the steering wheel, the present invention prevent the differential pressure from originating, and the rigidity of the steering operation is enhanced as well.

When the relative rotational angle between the valve members is bigger than the predetermined angle, namely when the steering wheel is operated beyond the overlapping amount between the opposite convex portions, the differential pressure between the chambers originates because an overlapping relation between the opposite convex portions reverses so as to underlap in themselves in the second control portion. Consequently, the power assist is adequately produced in the power steering apparatus.

Moreover, the overlapping variable orifice functions to substantially shut off the flow at and around the neutral position of the steering wheel. Therefore, it is possible to extensively adjust the beginning point where the power assist is produced by operating the steering wheel from its neutral position, and besides, as for the steering feeling, the beginning point is distinguished so that the center of steering operation can be settled on the neutral position of the steering wheel.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 1:
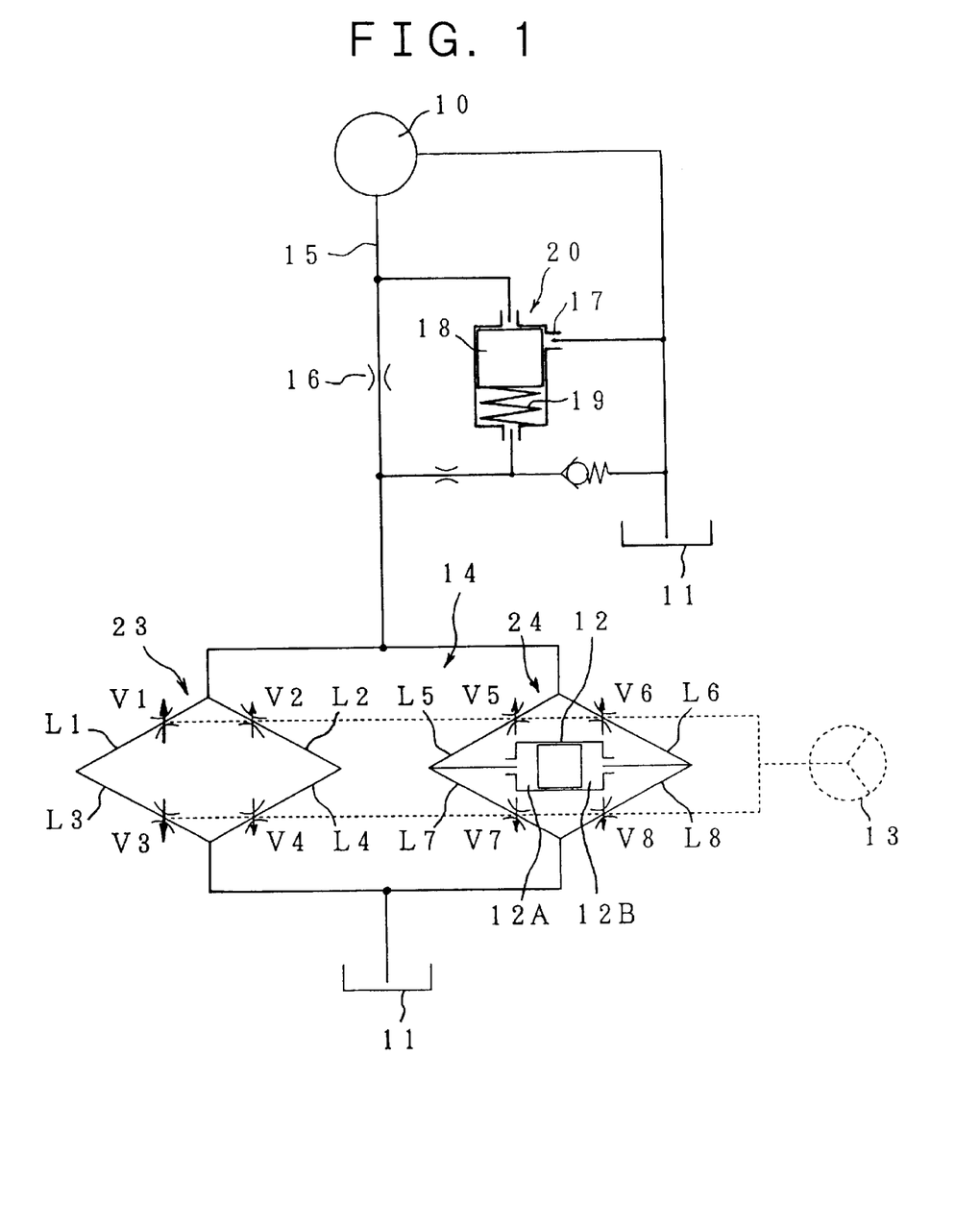
FIG. 1 is a typical diagram showing a power steering apparatus according to the present inventions.

Referring now to FIG. 1, the present invention will be described hereinafter. The present embodiment comprises a pump 10, namely a fluid source, driven an unshown automotive engine, reservoir 11, a power cylinder 12 for assisting steering operation and having two opposite chambers 12A, 12B, and a rotary control valve 14 for controlling a flow of pressurized fluid supplied from the pump 10 to the power cylinder 12 according to the operation of the steering wheel 13.

A pump assembly has the pump 10 and a known fluid control valve 20. The fluid control valve 20 comprises a metering orifice 16 provided in an outlet passage 15, a bypass valve 18 provided in parallel to the metering orifice 16 and for controlling the flow of the pressurized fluid in a bypass passage 17 according to a differential pressure between upper and lower streams of the metering orifice 16, and a spring 19 for biasing the bypass valve 18 so as to close the bypass passage 17.

Figure 2:
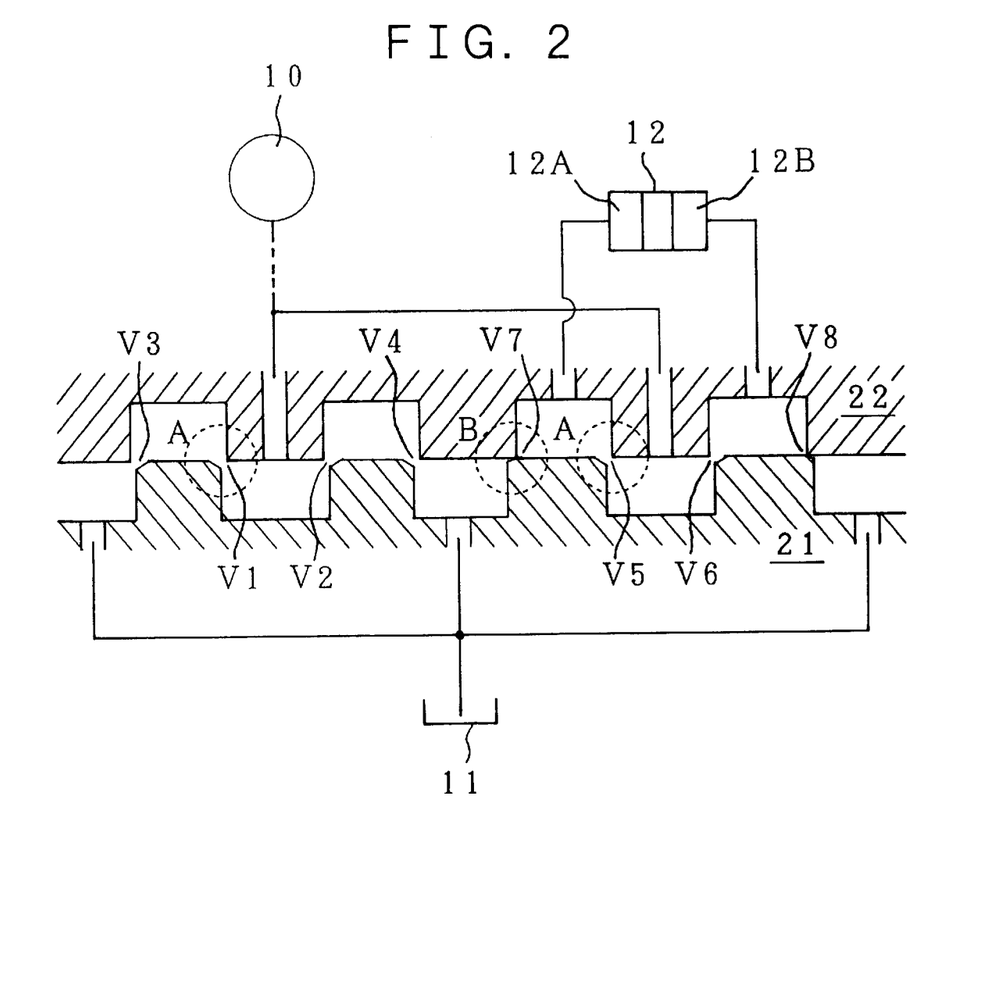
FIG. 2 is a schematic representation which develops a rotary control valve in circumference.

The rotary control valve 14, as it is shown in FIG. 2, comprises a valve shaft 21 rotating in association with the steering wheel 13, a valve body 22 coaxially arranged so as to enclose the valve shaft 21 in it and linking to an unshown steering linkage, an unshown torsion bar for allowing the relative rotation between the valve shaft 21 and the valve body 22 within a certain elastic range, and an unshown valve housing for housing the above-mentioned members. Each variable orifice is arranged on circumferences of the valve shaft 21 and the valve body 22 for controlling the flow of the pressurized fluid. In the configuration of the variable orifice, the variable orifices all are alternatively arranged at ninety-degrees intervals, in each of the valve body 21 and the valve shaft 22.

Figure 3:
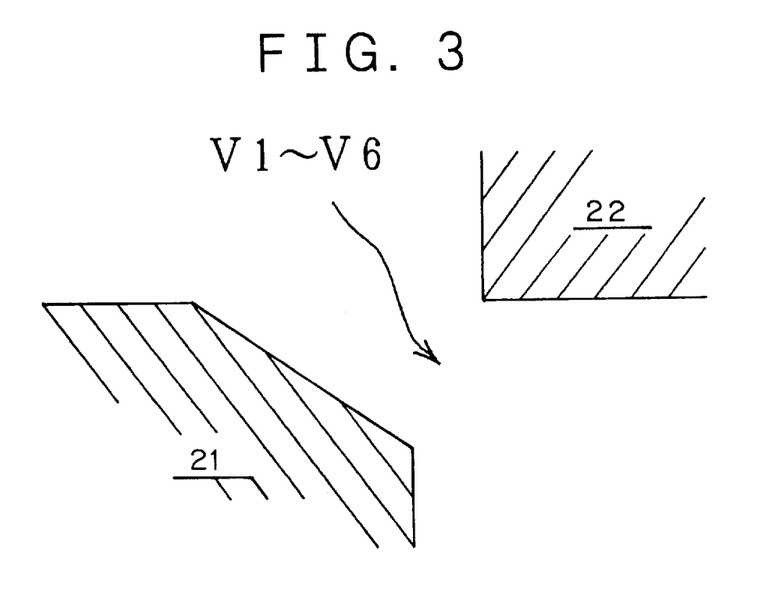
FIG. 3 is an enlarged detail of a section A shown in the FIG. 2.
Figure 5:
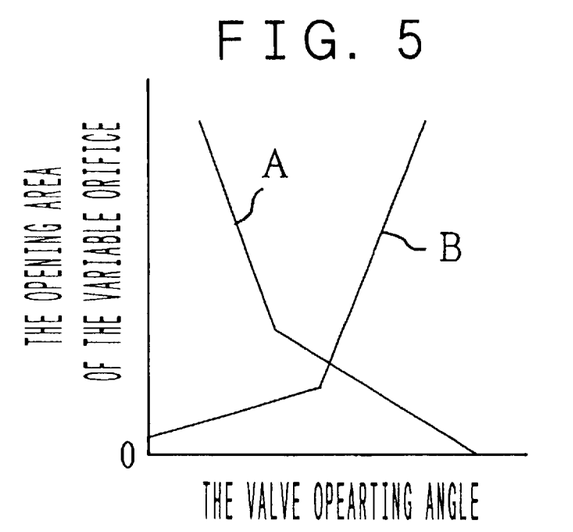
FIG. 5 is a graph showing a relationship between a valve operating angle of the rotary control valve and an opening area of variable orifices A and B, respectively.

The plural orifices arranged in the rotary control valve 14 make up of two hydraulic bridge circuits, which are shown in parallel in the FIG. 1. Then, these hydraulic bridge circuits will be called first and second control portions 23, 24 hereinafter, respectively. In the first control portion 23, four variable orifices V1~V4 are respectively provided on four passages L1~L4 which communicate with either the pump 10 or the reservoir 11. The configuration of these variable orifices V1~V4 forms a center-opened valves. As it is shown in FIG. 3, each of the variable orifices V1~V4 takes the form of underlap in itself, so that each opening area of the variable orifices V1~V4 becomes to decrease as the rotary control valve 14 is rotated from its neutral state. Thus, the relationship between the opening area and a valve operating angle which is a relative rotational angle between the valve shaft 21 and valve body 22, changes as a solid line A of FIG. 5.

Figure 4:
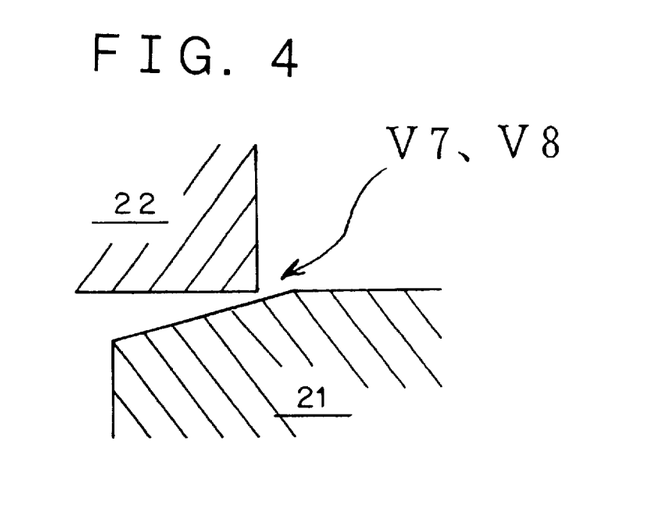
FIG. 4 is an another enlarged detail of a section B shown in the FIG. 2.

In the second control portion 24, four variable orifices V5~V8 are provided on four passages L5~L8, respectively. The variable orifices V5, V6 communicate with the pump 10, whereas the variable orifices V7, V8 communicate with the reservoir 11. And furthermore, all of the variable orifices V5~V8 communicate with the power cylinder 12. The configuration of the variable orifices V5, V6 forms center-opened valve, while the configuration of the other variable orifices V7, V8 forms semi-center-opened valve. In other words, though each of the variable orifices V5, V6 takes the form of underlap in itself in the neutral state of the rotary control valve like the variable orifices V1~V4, each of the variable orifices V7, V8 especially takes the form of overlap in itself. An it is shown in FIG. 4, each opening area of the variable orifices V7, V8 becomes to increase as the rotary control valve 14 is rotated from its,neutral state. Thus, the relationship between the opening area and the valve operating angle changes as a solid line B of the FIG. 5.

Now, in the neutral state of the rotary control valve 14, each opening area of the overlapping orifices V7, V8 is sufficiently smaller, compared with each opening area of the underlapping variable orifices V1~V6. In the FIG. 5, as the rotary control valve 14 is rotated, the relationship between two opening areas shown by the solid lines A, B becomes closer. Finally, this relationship reverses and then becomes further. Relating to each opening area of the overlapping orifices V7, V8 at the exactly neutral state of the rotary control valve 14, a certain amount is given to each of these opening areas as a preload in order to comfortably operate the steering wheel 13 from its neutral position. The amount is determined according to the various type of the vehicle because the mechanical resistance is inherent in any steering gear.

As the present embodiment was described hereinbefore, the pressurized fluid is supplied from the pump 10 to the first and second control portions 23, 24 through the metering orifice 16. At the neutral position of the steering wheel 13, almost all the flow of the pressurized fluid supplied from the pump 10 drains to the reservoir 11 through the variable orifices V1~V4 in the first control portion 23, while both the chambers 12A, 12B of the power cylinder 12 communicate with the pump 10 through the variable orifices V5, V6 equally. Consequently, the differential pressure is not originated between the chambers 12A, 12B.

Provided to illustrate with the FIG. 2 for the sake of convenience, when the valve shaft 21 moves slightly left on the valve body 22 by rotationally operating the steering wheel 13, each opening area of the variable orifices V1, V4 expands. On the other hand, each opening area of the variable orifices V2, V3 reduces at the same time. Therefore, although the discharge pressure of the pump 10 rises slightly, the differential pressure originates little until the valve operating angle reaches an angle θ1 (actually 1.0°~1.5°). No differential pressure originates by reason that the opening area of the variable orifice V5 or V6 is sufficiently bigger, compared with the variable orifice V8 or V7, respectively. As a result, the differential pressure is maintained at substantially zero until the valve operating angle exceeds the angle θ1. On condition that the valve operating angle is less than or equal to the angle θ1, the differential pressure is prevented from rising as it is shown in a solid line of the FIG. 6. As for steering feeling, the rigidity of the steering operation is therefore enhanced, so that the steering operation feels manual at and around the neutral position of the steering wheel 13.

When the valve operating angle exceeds the angle θ1, the opening area of the variable orifice V6 is bigger than the variable, orifice V8. Thus, the pressure rises in the chamber 12A of the power cylinder 12 and the differential pressure between the chambers 12A, 12B originates sequentially.

Figure 2A:
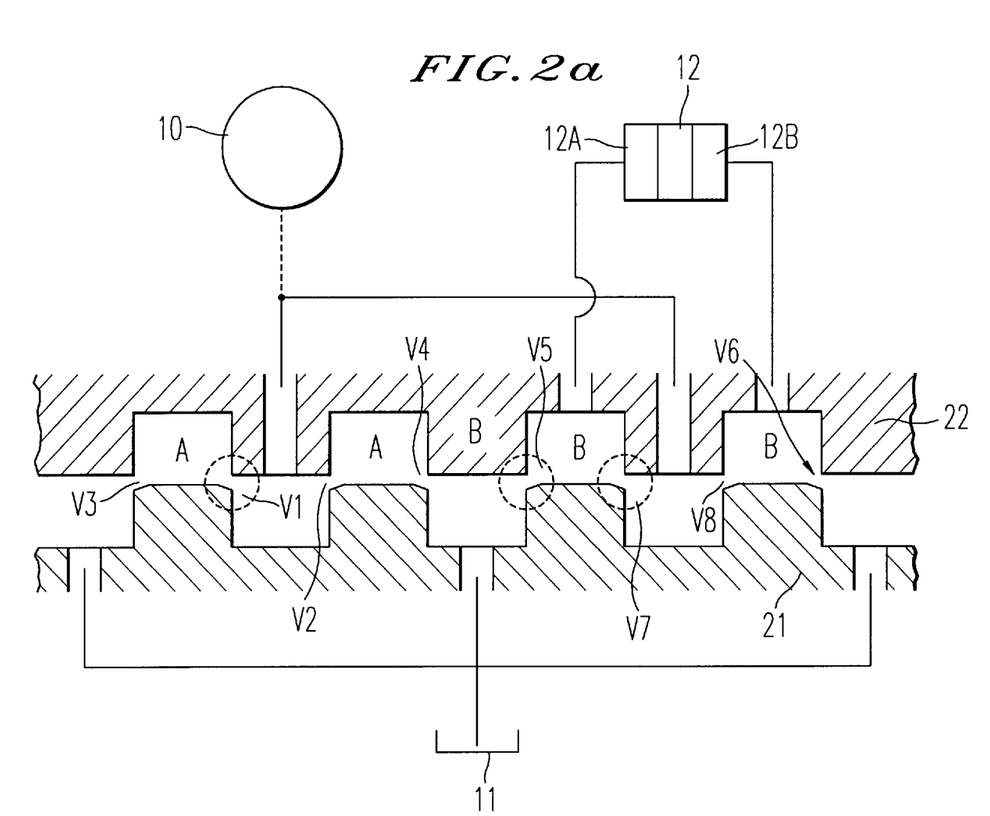

The aforementioned embodiment was describing a preferred example in which each of the variable orifices V7, V8 in the second control portion, especially on the side of reservoir 11, takes the form of the overlap in itself. As opposed to the above-mentioned examples each of the overlapping variable orifices V7, V8 may be arranged between pump 10 and cylinder 12, and underlapping variable orifices V5, V6 may be arranged between cylinder 12 and reservoir 11, as shown in FIG. 2a. In this case, the same function is obtained as well.

The present invention described hereinbefore provides the overlapping variable orifice, which takes the form of the overlap in itself, on the side of either the pump or the reservoir in the second control portion. Accordingly, the opening area of the overlapping variable orifice substantially increases little until the steering wheel is operated beyond the predetermined angle. When the steering wheel is operated beyond the predetermined angle, the opening area increases sufficiently according to the steering operation. In this manner, as a result, the present invention prevents the differential pressure in the power cylinder from originating at and around the neutral position of the steering wheel, despite an ascent of the discharge pressure of the pump. Thus, as for the steering feeling, the rigidity of the steering operation at and around the neutral position is enhanced. And furthermore, the steering operation is improved when the steering wheel is rotated from its neutral position, because the beginning point where the power assist is produced by operating the steering wheel from its neutral position is distinguished.

Moreover, an adjustment of the beginning point is applied with an extensive range.

Obviously, numerous modifications and variations of the present invention are possible in light of the above teachings. It in therefore to be understood that within the scope of the appended claims, the present invention may be practiced otherwise than as specifically described herein.

What is claimed is:

1. A power steering apparatus comprising a fluid source for supplying pressurized fluid, a reservoir, a power cylinder having two fluid chambers, and a control valve for controlling a flow of the pressurized fluid supplied from said fluid source according to the operation of a steering wheel, said control valve comprising:

a first control means for controlling the flow of pressurized fluid drained from said fluid source to said reservoir, said first control means having at least an underlapping variable orifice which takes the form of underlap in itself in a neutral state of said control valve; and a second control means for controlling the flow of pressurized fluid supplied from said fluid source to said power cylinder, said second control means having at least an overlapping variable orifice which takes the form of overlap in itself in the neutral state of said control valve.

2. A power steering apparatus comprising a fluid source for supplying pressurized fluid, a reservoir, a power cylinder having two fluid chambers, and a control valve for controlling a flow of the pressurized fluid supplied from said fluid source according to the operation of a steering wheel, said control valve comprising:

a first control means for controlling the flow of pressurized fluid drained from said fluid source to said reservoir, said first control means having at least an underlapping variable orifice which takes the form of underlap in itself in a neutral state of said control valve; and a second control means for controlling the flow of pressurized fluid supplied from said fluid source to said power cylinder, said second control means having at least two underlapping variable orifices, and also said second control means having at least two overlapping variable orifices which take the form of overlap in themselves in the neutral state of said control valve and which are arranged on the side of either said reservoir or said fluid source.

3. A power steering apparatus according to claim 1, wherein said second control means further comprises:

at least two underlapping variable orifices;

two supply passages respectively making said fluid source communicate with said fluid chambers, and said underlapping variable orifices being so provided on each said supply passage as to open a flow in a neutral state of said control valve; and two drain passages respectively making said fluid chambers communicate with said reservoir, and on each of said two drain passages, and said overlapping variable orifices being so provided on said drain passage as to partially close the flow in the neutral state of said control valve.

4. A power steering apparatus according to claim 1 wherein said overlapping variable orifice keeps the form of overlap in itself at and around the neutral position of the steering wheel, so that an opening area of said overlapping variable orifice increases little, whereas said opening area sufficiently increases according to the operation of the steering wheel as the steering wheel is rotated beyond a predetermined angle.

5. A power steering apparatus according to claim 1, wherein said overlapping variable orifice keeps the form of overlap in itself while a steering wheel is rotated from its neutral position to a predetermined angle, so that a differential pressure between said fluid chambers substantially originates little at and around the neutral position of the steering wheel.

6. A power steering apparatus according to claim 2, wherein said second control means further comprises:

two supply passages respectively making said fluid source communicate with said fluid chambers, and said underlapping variable orifices being so provided on each said supply passage as to open a flow in a neutral state of said control valve; and two drain passages respectively making said fluid chambers communicate with said reservoir, and on each of said two drain passages, and said overlapping variable orifices being so provided on said drain passage as to partially close the flow in the neutral state of said control valve.

7. A power steering apparatus comprising a fluid source for supplying pressurized fluid, a reservoir, a power cylinder having two fluid chambers, and a control valve for controlling a flow of the pressurized fluid supplied from said fluid source according to the operation of a steering wheel, said control valve comprising:

a first control means for controlling the flow of pressurized fluid drained from said fluid source to said reservoir, said first control means having at least an underlapping variable orifice which takes the form of underlap in itself in a neutral state of said control valve; and a second control means for controlling the flow of pressurized fluid supplied from said fluid source to said power cylinder, said second control means having at least two underlapping variable orifices arranged between said reservoir and said cylinder, and also said second control means having at least two overlapping variable orifices which take the form of overlap in themselves in the neutral state of said control valve arranged between said fluid source and said cylinder.

8. A power steering apparatus according to claim 2, wherein said at least two overlapping variable orifices keep the form of overlap in itself at and around the neutral position of the steering wheel, so that an opening area of said overlapping variable orifice increases little, whereas said opening area sufficiently increases according to the operation of the steering wheel as the steering wheel is rotated beyond a predetermined angle.

9. A power steering apparatus according to claim 3, wherein said at least two overlapping variable orifices keep the form of overlap in itself at and around the neutral position of the steering wheel, so that an opening area of said overlapping variable orifice increases little, whereas said opening area sufficiently increases according to the operation of the steering wheel as the steering wheel is rotated beyond a predetermined angle.

10. A power steering apparatus according to claim 2, wherein said at least two overlapping variable orifices keep the form of overlap in itself while a steering wheel is rotated from its neutral position to a predetermined angle, so that a differential pressure between said fluid chambers substantially originates little at and around the neutral position of the steering wheel.

11. A power steering apparatus according to claim 3, wherein said at least two overlapping variable orifices keep the form of overlap in itself while a steering wheel is rotated from its neutral position to a predetermined angle, so that a differential pressure between said fluid chambers substantially originates little at and around the neutral position of the steering wheel.

* * * * *